United States Patent
Lee (10) Patent No.: US 9,709,389 B2
(45) Date of Patent: Jul. 18, 2017

(54) APPARATUS AND METHOD FOR MEASURING THE SLOSHING IN THE CARGO TANK OF A LIQUEFIED NATURAL GAS CARRIER

(76) Inventor: Michael Myungsub Lee, Seoul (KR)

( * ) Notice: Subject to any disclaimer, the term of this patent is extended or adjusted under 35 U.S.C. 154(b) by 286 days.

(21) Appl. No.: 14/362,969

(22) PCT Filed: Oct. 25, 2011

(86) PCT No.: PCT/KR2011/007969
§ 371 (c)(1),
(2), (4) Date: Jun. 5, 2014

(87) PCT Pub. No.: WO2013/062147
PCT Pub. Date: May 2, 2013

(65) Prior Publication Data
US 2015/0020604 A1    Jan. 22, 2015

(30) Foreign Application Priority Data

Oct. 24, 2011    (KR) .......................... 10-2011-0108800

(51) Int. Cl.
*G01B 11/16*    (2006.01)
*G01P 15/093*    (2006.01)

(52) U.S. Cl.
CPC ............ *G01B 11/16* (2013.01); *G01P 15/093* (2013.01); *F17C 2250/0482* (2013.01); *F17C 2260/016* (2013.01); *F17C 2270/0105* (2013.01)

(58) Field of Classification Search
CPC ......... G01B 11/16; B63B 25/08; B63B 25/16; B63B 9/00; G01N 15/06; G01F 23/00;
(Continued)

(56) References Cited

U.S. PATENT DOCUMENTS 5,257,090 A * 10/1993 Meinzer ................ G01F 23/292
                                                        250/205
5,585,786 A * 12/1996 Clark .................... G01F 23/706
                                                        340/619
(Continued)

FOREIGN PATENT DOCUMENTS

CN          1175305          3/1998
CN        201 043 905        4/2008
(Continued)

OTHER PUBLICATIONS

International Search Report for International Application No. PCT/KR2011/007969.
(Continued)

*Primary Examiner* — Lisa Caputo
*Assistant Examiner* — Octavia Hollington
(74) *Attorney, Agent, or Firm* — Mintz Levin Cohn Ferris Glovsky and Popeo, P.C.; Kongsik Kim; Jonathon Western (57) ABSTRACT

An apparatus and method for measuring the sloshing in the cargo tank of a liquefied natural gas carrier is provided. The apparatus includes: a plate-shaped floating mat coupler which floats on the surface of the liquefied natural gas contained in the cargo tank of a liquefied natural gas carrier and moves in accordance with the movement of the liquefied natural gas; and an optical sensor measuring acceleration using optical sensor technology to measure acceleration when the floating mat coupler floats by being inserted in one or more positions in the floating mat coupler. The characteristics of the movement occurring in accordance with the sloshing of the liquefied natural gas in the cargo tank of a liquefied natural gas carrier, and the shock and deformation which the inner wall of the cargo tank is subjected to because of such movement, are measured at multiple angles.

24 Claims, 4 Drawing Sheets

(58) Field of Classification Search
CPC ........ G01F 23/64; G01F 23/30; G01F 23/292; G01F 23/284; G01F 23/68; G01F 23/72; B65D 1/40; G01P 15/093
USPC .......................................................... 73/800
See application file for complete search history.

(56) References Cited

U.S. PATENT DOCUMENTS

| | | | | |
|---|---|---|---|---|
| 5,942,750 | A * | 8/1999 | Sannerhaugen | G01B 11/18 250/227.14 |
| 7,155,349 | B1 * | 12/2006 | Souluer | G01F 23/366 702/55 |
| 7,377,162 | B2 * | 5/2008 | Lazaris | A47J 31/4457 222/51 |
| 7,963,111 | B2 * | 6/2011 | Doleh | F03B 13/1875 290/1 R |
| 8,171,786 | B2 * | 5/2012 | Burris | G01F 23/2962 73/290 V |
| 8,235,241 | B2 * | 8/2012 | Ramsay | B60K 15/077 220/216 |
| 8,643,509 | B1 * | 2/2014 | Chen | B63B 9/08 114/74 R |
| 8,708,190 | B2 * | 4/2014 | Chun | B65D 90/52 220/563 |
| 2004/0102918 | A1 | 5/2004 | Stana | |
| 2011/0083504 | A1 * | 4/2011 | Unger | G01C 9/20 73/304 C |
| 2016/0229492 | A1 * | 8/2016 | Lee | B63B 9/00 |

FOREIGN PATENT DOCUMENTS

| | | | |
|---|---|---|---|
| CN | 101 813 476 | | 8/2010 |
| EP | 2 364 931 | | 9/2011 |
| FR | 2945511 | * | 5/2009 |
| JP | 18069627 | | 3/2006 |
| KR | 10-0697055 B1 | | 3/2007 |
| KR | 10-0913536 B1 | | 8/2009 |
| KR | 100913536 | * | 8/2009 |
| KR | 1009135360000 | | 8/2009 |
| KR | 20100067791 | * | 6/2010 |
| KR | 10-1010989 B1 | | 1/2011 |
| KR | 1010109890000 | | 1/2011 |

OTHER PUBLICATIONS

Search Report issued on Mar. 23, 2015 in corresponding Eurpean Patent Application No. 11874667.6.
Office Action in corresponding Chinese Application No. 201180075892.6.

* cited by examiner

APPARATUS AND METHOD FOR MEASURING THE SLOSHING IN THE CARGO TANK OF A LIQUEFIED NATURAL GAS CARRIER

TECHNICAL FIELD

The present invention relates to an apparatus and a method for measuring sloshing in a cargo tank oil a liquefied natural gas carrier. The apparatus and the method for measuring sloshing are applicable to a wider range including tanks of a land terminal and a marine terminal in case of need.

BACKGROUND ART

Liquefied natural gas (LNG, hereinafter, called 'LNG' for convenience's sake in description) is obtained by liquefying natural gas extracted from a gas field. LNG is distinguished from liquefied petroleum gas (LPG) in that the chief ingredient of LNG is methane. The pressure of LNG is reduced to ¹/₆₀₀ when the LNG is liquefied by pressure applied, but because the boiling point of methane is at low temperature of −162° C., methane is cooled or compressed, and then, is transferred to a tank which as specially insulated. LNG is mainly used as city gas because it is a colorless and transparent liquid which has little pollutants and has a high heating value.

In the meantime, a ship which is manufactured to transport LNG is called a liquefied natural gas carrier (LNGC, hereinafter called 'LNG carrier' for convenience's sake in description). Such an LNG carrier includes an insulated cargo tank (hereinafter called 'LNG tank' for convenience's sake in description) which can store LNG.

Figure 1:
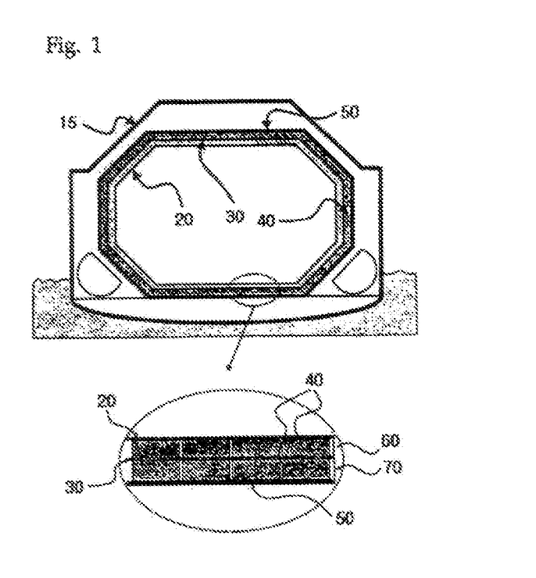
FIG. 1 shows a structure of an LNG tank mounted in an LNG carrier and an insulation area of the LNG tank.

As shown in FIG. 1, the LNG tank of the LNG carrier includes: an LNG tank outer wall 50 which is made of metal strong to low temperature and disposed inside a ship outer wall 15 made of metal; a second insulation area 70 having an LNG tank outer wall 50 and a second adiabatic membrane 30 therein; a first insulation area 60 having the second adiabatic membrane 30 and a first adiabatic membrane 20; and thermal insulators 40 respectively disposed in the insulation areas.

Because the first adiabatic membrane 20 forms an inside space of the LNG tank and directly comes into contact with LNG of an extremely low temperature, if the first adiabatic membrane 20 leaks, LNG penetrates into the first insulation area 60 so as to put the LNG carrier in danger of explosion. Here, the adiabatic membrane is made of stainless steel and invar which is an alloy of which main components are iron and nickel and thermal expansivity is very low. The adiabatic membrane is fabricated by assembling and welding a thin sheet which is 0.7 mm to 3 mm in thickness into a predetermined size. The thermal insulators 40 are fabricated by glass fiber, perlite and urethane foam formed into the predetermined size and are respectively assembled between the LNG tank outer wall 50 and the second adiabatic membrane 30 and between the second adiabatic membrane 30 and the first adiabatic membrane 20 in order to insulate therebetween.

Figure 2:
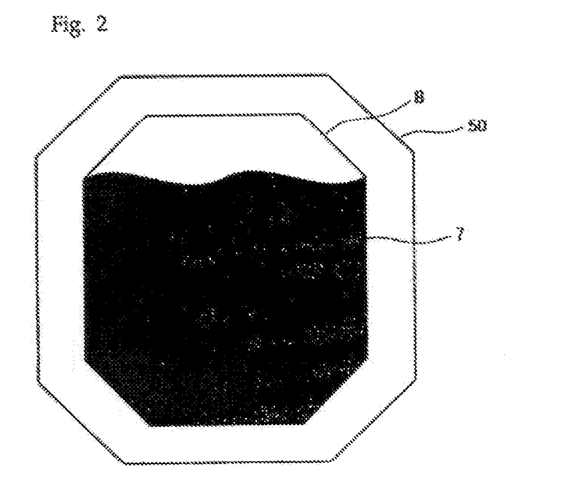
FIG. 2 shows sloshing generated by liquid movements inside the LNG tank.

Because the LNG tank of the LNG carrier stores and carries ultralow LNG of 162 degrees below zero which is compressed and liquefied at high pressure, the LNG tank receives a structural stress such as continuous compression and expansion according to changes in pressure due to loading and unloading of LNG. Moreover, the LNG carrier carries LNG while sailing in rough seas and uses six degree-of-freedom motions (roll, pitch, yaw, and so on) while carrying LNG. Therefore, sloshing as shown in FIG. 2 is caused by liquid slosh inside the LNG tack, and it continuously applies shock to the structure, namely, the adiabatic membrane of the LNG tank so that fatigue is accumulated. When the first and second adiabatic membranes 20 and 30 are damaged due to weld defects or physical factors, it causes deterioration in adiabatic effects and leakage of LNG because vacuum states or pressurized states inside the adiabatic membranes are not maintained.

The deterioration in thermal insulation properties due to the leakage of the adiabatic membranes increases evaporation pressure or the LNG which is stored in the LNG tank. However, if the evaporation pressure becomes higher than design pressure of the LNG tank, LNG must be discharged out in order to reduce pressure of the LNG tank, and it means consumption of the stored LNG. The LNG carrier suffers great losses (the amount of damages is estimated at many billions won) if the vaporized LNG is discharged out and consumed due to excessive pressure. Additionally, if the first adiabatic membrane is damaged and leaks, it is dangerous because the vaporized LNG may be introduced into the first thermal insulator 40 and the LNG tank may be exploded. For these reasons, it is necessary to exactly measure sloshing of LNG inside the LNG tank and to design and repair the LNG tank in correspondence with the measured values.

DISCLOSURE

Technical Problem

Accordingly, the present invention has been made in an effort to solve the above-mentioned problems occurring in the prior arts, and it is an object of the present invention to provide an apparatus and a method for measuring sloshing in a cargo tank of a liquefied natural gas carrier which includes an optical sensor disposed inside the LNG tank and a floating mat having the optical sensor, thereby measuring shock or deformation applied to the LNG tank inner wall in various ways and effectively analyzing the measured result.

TECHNICAL SOLUTION

To achieve the above objects, the present invention provides an apparatus for measuring sloshing in a cargo tank of a liquefied natural gas carrier including: a plate-shaped floating mat assembly which floats together with a movement of liquefied natural gas (LNG) on the surface of LNG stored in the cargo tank of the LNG carrier; and optical acceleration sensors mounted at one or more positions of the floating mat assembly to measure acceleration generated when the floating mat assembly floats, using an optical sensor technology.

In another aspect of the present invention, there is a method for measuring sloshing in a cargo tank of a liquefied natural gas carrier using an apparatus for measuring sloshing in the cargo tank of the liquefied natural gas carrier including the steps of: floating a floating mat assembly on the surface of LNG stored in the cargo tank of the LNG carrier according to a movement of the LNG; and measuring acceleration using the optical sensor technology by optical acceleration sensors when the floating mat assembly floats.

Advantageous Effects

The apparatus and method for measuring sloshing in a cargo tank of a liquefied natural gas carrier according to the present invention can measure and effectively analyze the movement characteristics by sloshing of LNG in the LNG tank of the LNG carrier and shock and deformation applied to the LNG tank inner wall at multiple angles by the movement characteristics in order to accurately determine the problems of the LNG tank caused by the sloshing of LNG and to design and repair the LNG tank more perfectly.

Additionally, the floating mat assembly according to a preferred embodiment of the present invention minimizes evaporation of LNG by increasing the insulation effect and density distribution blocking effect between a liquefied face and vaporized face inside the LNG tank. Moreover, the floating mat assembly according to a preferred embodiment of the present invention serves as a damper so as to minimize vaporization of LNG by restraining an increase of kinetic energy of LNG induced by sloshing and to minimize collision and shock applied to the LNG tank inner wall. Therefore, the floating mat assembly according so a preferred embodiment of the present invention can minimize an amount of vaporized LNG to be released into the atmosphere for a safe sailing because minimizing the increase of pressure inside the LNG tank by vaporization of LNG, and it is very advantageous to prevent environmental pollution.

EXPLANATION OF ESSENTIAL REFERENCE NUMERALS IN DRAWINGS

1: floating mat assembly
2: floating mat unit
3: closed empty space inside floating mat unit
4: optical acceleration sensor
5: optical strain sensor
6: optical fiber
7: LNG
8: LNG tank inner wall
9: data analyzing means
15: LNG carrier outer wall
20: first adiabatic membrane
30: second adiabatic membrane
40: thermal insulator
50: LNG tank outer wall
60: first insulation area
70: second insulation area

MODE FOR INVENTION

Hereinafter, reference will be now made in detail to the preferred embodiments of the present invention with reference to the attached drawings. In the drawings, the same components have the same reference numerals even though they are illustrated in different figures. In addition, in the description of the present invention, when it is judged that detailed descriptions of known functions or structures related with the present invention may make the essential points vague, the detailed descriptions of the known functions or structures will be omitted.

Measuring apparatus of sloshing inside cargo tank of LNG carrier

It is an object of the present invention to provide an apparatus for measuring and effectively analyzing the movement characteristics by sloshing of liquefied natural gas (hereinafter, called 'LNG') and shock or deformation applied to the LNG tank inner wall at multiple angles through an optical sensor disposed in the LNG tank. Therefore, in order to achieve the object, the apparatus includes a floating mat assembly 1 and optical acceleration sensors 4.

The basic technical idea of the present invention is to directly measure the sloshing by moving in integration with LNG inside the LNG tank and experiencing the sloshing rather than to grasp or infer and interpret the sloshing just by visually figuring out the sloshing inside the LNG tank. In order to realize such a technical idea of the present invention, the floating mat assembly 1 was adopted.

Figure 6:
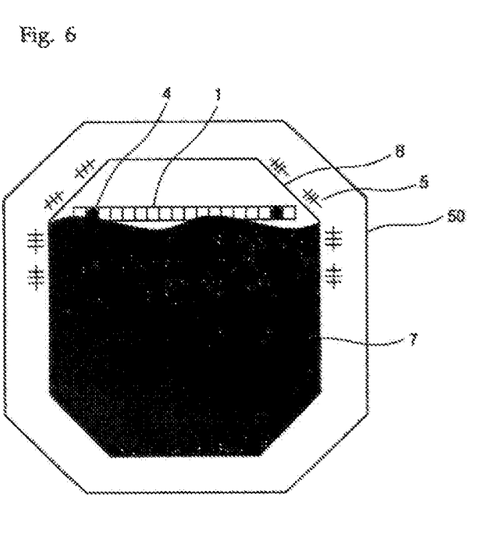
FIG. 6 is a view of an apparatus for measuring sloshing inside a cargo tank of a liquefied natural gas carrier according to the preferred embodiment of the present invention.

As shown in FIG. 6, the floating mat assembly 1 is a plate-shaped structure which floats on the surface of an LNG 7 stored in the LNG tank according to the movement of the LNG 7. Therefore, the floating mat assembly 1 is at a stop or moves at a very slow rate in a state where it floats on the surface of she LNG 7 when the LNG 7 is not moved, but sometimes collides against or bounces off an LNG tank inner wall 8 while moving at a rapid speed in the state where the floating mat assembly 1 floats on the surface of the LNG 7 when the LNG 7 is waved by the sloshing. That is, the floating mat assembly 1 shows the movement identical with the fluid movement of the LNG 7. Therefore, the sloshing of the LNG 7 can be measured by measuring the movement of the floating mat assembly 1.

According to the preferred embodiment of the present invention, the floating mat assembly 1 may be a single body structure, but it is more preferable that a plurality of floating mat units 2 of a small size be coupled together in order to form a large-sized floating mat assembly 1. The reason is to reduce a burden in an operation process to manufacture a floating mat assembly 1, which is as large as the inner area of the LNG tank of a huge structure, at a time and to freely obtain the floating mat assembly 1 which has the size or shape suitable for situations by coupling the small-sized floating mat units 2 with one another.

Figure 3:
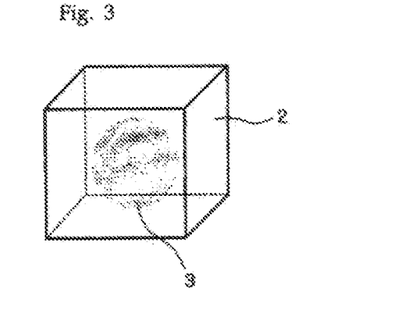
FIG. 3 is a view of a floating mat unit according so a preferred embodiment of the present invention.
Figure 4:
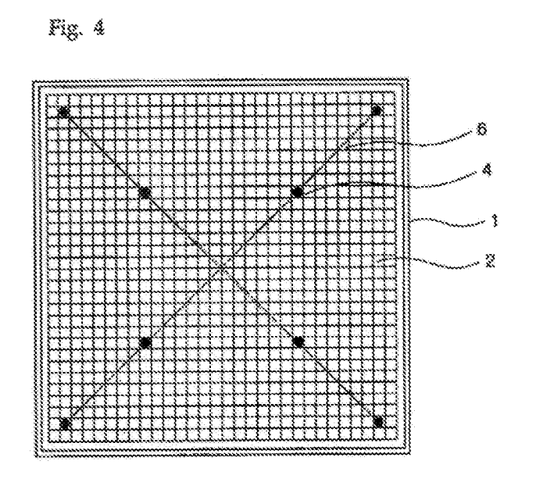
FIG. 4 is a plan view of a floating mat assembly according to the preferred embodiment of the present invention.
Figure 5:
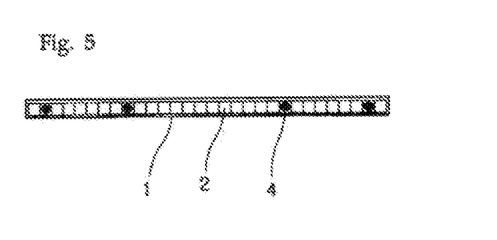
FIG. 5 is a side view of the floating mat assembly according to the preferred embodiment of the present invention.

It is good that the floating mat units 2 have a polyhedral shape so that faces of the floating mat units 2 come into contact with each other. FIG. 3 shows a hexahedron shape or a regular-hexahedron shape among various polygonal shapes that the floating mat unit 2 can adopt according to the preferred embodiment of the present invention. Moreover, FIGS. 4 and 5 are a plan view and a side view of the floating mat assembly 1 of a wide plate shape formed by the hexahedron-shaped or regular hexahedron-shaped floating mat units 2 of which faces come into continuous contact with each other.

Figure 7:
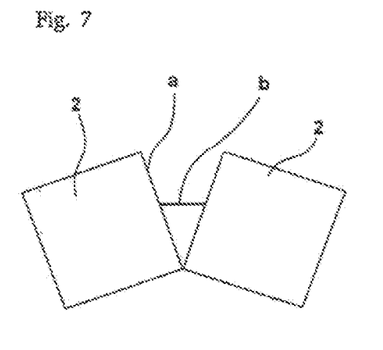
FIG. 7 shows a coupling method of the floating mat units according to the preferred embodiment of the present invention.
Figure 8:
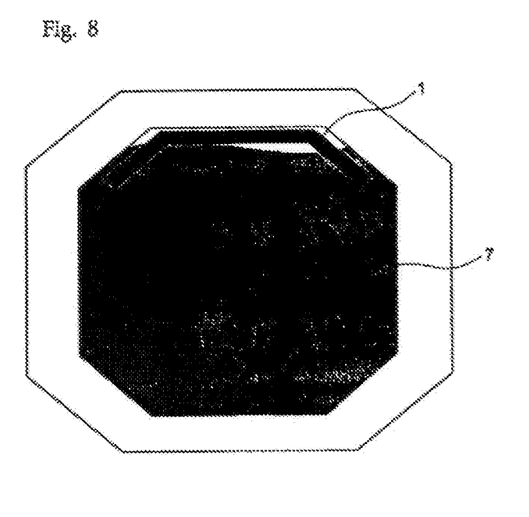
FIG. 8 is a change in shape of the floating mat assembly according to the preferred embodiment of the present invention.

In this instance, as shown in FIG. 7, it is preferable that the contact faces (a) of the floating mat units 2 be not perfectly attached and fixed to each other but mutually connected in such a manner as to be bent when an external force is applied, and in this instance, the floating mat units 2 may be mutually connected, for instance, by string-like connecting means (b). Then, as shown in FIG. 8, if the LNG tank is fully filled with the LNG 7, the floating mat assembly 1 of the wide plate shape which comes into contact with the ceiling of the LNG tank is folded to prevent damage. Of course, when the LNG 7 is discharged out, the floating mat assembly 1 is returned to its original state.

In the meantime, it is preferable that the floating mat units 2 be made of a soft material which is floatable in the LNG 7 and is transformable by an external force. Because the floating mat assembly 1 formed by connection of the floating mat units 2 is transformed according to the movement of the surface of the LNG 7, the apparatus according to the preferred embodiment of the present invention can exactly measure the movement form of the surface of the LNG 7 when the sloshing is generated, and prevent damages of the LNG tank inner wall 8 due to collision of the floating mat assembly 1, which is floating, against the LNG tank inner wall 8, Furthermore, as shown in FIG. 3, it is more preferable that the floating mat units 2 have a closed space 3 formed inside the body. By an action of the closed space 3, the floating mat units 2 and the floating mat assembly 1 can float inside the LNG 7 more easily.

The shape of the floating mat assembly 1 is not specially limited, but preferably, the floating mat assembly 1 is formed in a regular polygonal plate shape or a circular plate shape. The reason is that such a shape is a help to arrange the optical acceleration sensors 4 which will be described later on the floating mat assembly 1 uniformly and to uniformly measure the degree of movement or strain of the floating mat assembly 1 which floats inside the LNG tank without being partial to a specific directivity. FIG. 4 shows the floating mat assembly 1 of a regular hexahedron shape.

The optical acceleration sensors 4 are inserted into one or more positions of the floating mat assembly 1 and measures acceleration, which is generated when the floating mat assembly 1 floats, using the optical sensor technology. The optical sensor senses the amount or position of light, which is blocked (through beam type) or reflected (reflection type) after the sensor transmits light of a specific wavelength, using an element such as a photodiode. The optical sensor which is a noncontact type is suitable for a high speed production line because it has a long life and a rapid speed of response, can sense small spaces or small things using optical fiber, and can measure from a long distance using an optical lens. As described above, the optical sensor can be applied to various applications and is very economical for its function.

Because the optical acceleration sensors 4 moves together with the floating mat assembly 1 as shown in FIG. 6 in the state where it is inserted into the floating mat assembly 1 as shown in FIG. 5, acceleration measured by the optical acceleration sensors 4 is directly acceleration obtained by the movement or strain of the floating mat assembly 1, but is finally acceleration according to the movement of the surface of one LNG 7. In this instance, it is preferable that the optical acceleration sensors 4 are inserted into the floating mat assembly 1 at uniform intervals, preferably, radially, as shown in FIG. 5 in order to enhance accuracy or reliability in measurement. It is a help to uniformly accept and measure the degree of movement or strain of the floating mat assembly 1 which floats inside the LNG tank without being partial to a specific directivity. On the other hand, as shown in FIG. 4, the optical acceleration sensors 4 are connected with each other through an optical fiber 6.

As described above, the floating mat assembly 1 according to the preferred embodiment of the present invention was adopted and the movement by the sloshing of the LNG 7 inside the LNG tank was reflected as it was, and then, the optical acceleration sensors 4 measured acceleration according to the movement or strain of the floating mat assembly 1 so as to directly and accurately measure acceleration according to the movement of the surface of LNG 7. However, the present invention further includes means for calculating various result values which can realistically and concretely grasp the sloshing of the LNG 7 from acceleration data measured by the optical acceleration sensors 4 in order to realize a more perfect technical idea of the present invention. For this, the present invention further includes data analyzing means 9.

The data analyzing means 9 is a computer device having data input and output, computation and processing functions. The data analyzing means 9 receives data from the optical acceleration sensors 4 while communicating with the optical acceleration sensors 4 outside the LNG tank of the LNG carrier, and then, calculates a predetermined result value from the data. In this instance, the data that the data analyzing means 9 received from the optical acceleration sensors 4, namely, the result values calculated from the acceleration values are as follows.

First, the data analyzing means 9 calculates floating speed and distance of the floating mat assembly 1 from the acceleration data received from the optical acceleration sensors 4. The floating speed and distance of the floating mat assembly 1 correspond to the speed and distance that a mass of LNG fluid 7 existing in a specific position inside the LNG tank, for instance, when the sloshing is generated, moves.

Moreover, the data analyzing means 9 calculates power that the floating mat assembly 1 applies to the cargo tank inner wall of the LNG carrier from the acceleration data received from the optical acceleration sensors 4. The power that the floating mat assembly 1 applies to the cargo tank inner wall of the LNG carrier corresponds to power that the mass of the LNG fluid 7 existing in a specific position inside the LNG tank when the sloshing is generated applies to the cargo tank inner wall of the LNG carrier.

Additionally, the data analyzing means 9 calculates strain of the floating mat assembly 1 from the acceleration data received from the optical acceleration sensors 4. Such a strain of the floating mat assembly 1 corresponds to that the mass of the LNG fluid 7 existing in the specific position inside the LNG tank is changed in form of the surface by the movement, for instance, when the sloshing is generated.

As described above, through the floating mat assembly 1, the optical acceleration sensors 4 and the data analyzing means 9, the technical idea of the present invention was perfectly realized. However, in order to realize technology to grasp the sloshing inside the LNG tank more wholly by widening the measurement range to the LNG tank inner wall 8 including the LNG 7, the present invention further includes optical strain sensors 5.

As shown in FIG. 6, the optical strain sensors 5 are inserted into one or more positions of the LNG tank inner wall 8 of the LNG carrier, and measures strain of the LNG tank inner wall 8 generated by shock applied to the LNG tank inner wall 8 using the optical sensor technology when the LNG 7 moves. In this instance, it is preferable that the optical strain sensors 5 be arranged on the LNG tank inner wall 8 at uniform intervals in order to enhance accuracy or efficiency in measurement, and more preferably, the optical strain sensors 5 are intensively disposed at the ceiling and the upper portion of the side of the LNG tank inner wall 8 as shown in FIG. 6. The reason is that the ceiling and the upper portion or the side of the LNG tank inner wall 8 are shocked when sloshing is generated. Moreover, the optical strain sensors 5 are connected with each other by optical fiber. In the meantime, the data analyzing means 9 receives data from the optical acceleration sensors 4 while communicating with the optical strain sensors 5 and calculates a predetermined result value from the data.

Meanwhile, according to the preferred embodiment of the present invention, optical pressure sensors may be mounted on the bottom of the LNG tank in order to measure the level inside the LNG tank, such that the apparatus can secure lots of data which can grasp the sloshing more comprehensively. In this case, the optical pressure sensors are mounted at one or more positions of the bottom of the LNG tank to measure the level of the LNG 7 using the optical sensor technology. The pressure values measured by the optical pressure sensors are varied according to the quantity of the LNG 7 inside the LNG tank, and the level of the LNG 7 inside the LNG tank can be calculated when the pressure values and the volume of the LNG tank are calculated.

Method for measuring sloshing in cargo tank of liquefied natural gas carrier

The present invention also relates to a method for measuring sloshing in a cargo tank of a liquefied natural gas carrier (LNG carrier) using the apparatus for measuring sloshing in the cargo tank of the LNG carrier. The sloshing measuring method according to a preferred embodiment of the present invention will be described by steps in detail as follows. In this instance, the same description as the above-mentioned contents will be omitted.

First step: A floating mat assembly 1 floats together with the movement of an LNG 7 on the surface of the LNG 7 stored in the LNG tank of the LNG carrier.

Second step: The optical acceleration sensors 4 measure acceleration using the optical sensor technology when the floating mat assembly 1 floats. Furthermore, at the same time with the above, the optical strain sensors 5 measure strain of the LNG tank inner wall 8 generated by shock applied to the LNG tank inner wall 8 using the optical sensor technology when the LNG 7 moves.

Third step: The data analyzing means 9 receives data from either the optical acceleration sensors 4 or the optical strain sensors 5 while communicating with the optical acceleration sensors 4 or the optical strain sensors 5 outside the LNG tank of the LNG carrier, and then, calculates a predetermined result value from the data. In this instance, the data analyzing means 9 measures the floating speed and distance of the floating mat assembly 1, power of the floating mat assembly 1 applied to the LNG tank inner wall of the LNG carrier, strain of the floating mat assembly 1, and so on.

As described above, the preferred embodiment of the present invention can measure the movement characteristics by sloshing of the LNG inside the LNG tank of the LNG carrier and shook or strain applied to the LNG tank inner wall by the movement characteristics at multiple angles and effectively analyze them so as to design and maintain the LNG tank more perfectly by correctly grasping the problems caused by the sloshing of the LNG.

As described above, while the present invention has been particularly shown and described with reference to the example embodiments thereof, it will be understood by those of ordinary skill in the art that the above embodiments of the present invention are all exemplified and various changes, modifications and equivalents may be trade therein without changing the essential characteristics and scope of the present invention. Therefore, it would be understood that the embodiments disclosed in the present invention are not to limit the technical idea of the present invention but to describe the present invention, and the technical and protective scope of the present invention shall be defined by the illustrated embodiments. It should be also understood that the protective scope of the present invention is interpreted by the following claims and all technical ideas within the equivalent scope belong to the technical scope or the present invention.

INDUSTRIAL APPLICABILITY

The present invention can measure the movement characteristics by sloshing of the LNG inside the LNG tank of the LNG carrier and shock or strain applied to the LNG tank inner wall by the movement characteristics at multiple angles and effectively analyze them so as to design and maintain the LNG tank more perfectly by correctly grasping the problems caused by the sloshing of the LNG. The technology of the present invention is widely used in marine shipbuilding industry, shipbuilding material industry, and other control measurement industry so as to realize practical and economical values.

The invention claimed is:

1. An apparatus for measuring sloshing in a cargo tank of a liquefied natural gas (LNG) carrier, the apparatus comprising:
    a plate-shaped floating mat assembly disposed to float on the surface of LNG stored in the cargo tank of the LNG carrier and configured to move with the LNG; and
    optical acceleration sensors mounted at one or more positions of the floating mat assembly, such that the optical acceleration sensors float on or within the LNG, to measure acceleration generated via movement of the floating mat assembly, using an optical sensor technology,
    wherein the floating mat assembly is formed by a coupling of a plurality of floating mat units.

2. The apparatus according to claim 1, further comprising:
    optical strain sensors mounted at one or more positions of a cargo tank inner wall of the LNG carrier to measure strain of the cargo tank inner wall generated by shock applied to the cargo tank inner wall when LNG moves, using the optical sensor technology.

3. The apparatus according to claim 2, wherein the optical strain sensors are mounted in the cargo tank inner wall of the LNG carrier at uniform intervals.

4. The apparatus according to claim 2, wherein the optical strain sensors are mounted in the ceiling and the upper portion of the side of the cargo tank inner wall of the LNG carrier.

5. The apparatus according to claim 2, further comprising:
    data analyzing means which receives data from either the optical acceleration sensors or the optical strain sensors while communicating with the optical acceleration sensors or the optical strain sensors outside the LNG tank of the LNG carrier and calculates a predetermined result value from the data.

6. The apparatus according to claim 5, wherein the data analyzing means measures the floating speed and distance of the floating mat assembly from the acceleration data received from the optical acceleration sensors.

7. The apparatus according to claim 5, wherein the data analyzing means measures the power of the floating mat assembly applied to the cargo tank inner wall of the LNG carrier from the acceleration data received from the optical acceleration sensors.

8. The apparatus according to claim 5, wherein the data analyzing means measures strain of the floating mat assembly from the acceleration data received from the optical acceleration sensors.

9. The apparatus according to claim 1, wherein the floating mat units have a polyhedral shape so that faces of the floating mat units come into contact with each other.

10. The apparatus according to claim 9, wherein the contact faces of the floating mat units are not perfectly attached and fixed to each other but are mutually connected in such a manner as to be bent when an external force is applied.

11. The apparatus according to claim 1, wherein the floating mat units are made of a material which is floatable in LNG.

12. The apparatus according to claim 1, wherein the floating mat units are made of a material which is transformable by an external force.

13. The apparatus according to claim 1, wherein the floating mat units have closed empty spaces formed inside a body.

14. The apparatus according to claim 1, wherein the floating mat assembly is formed in a regular polygonal plate shape or a circular plate shape.

15. The apparatus according to claim 1, wherein the optical acceleration sensors are mounted in the floating mat assembly at uniform intervals.

16. The apparatus according to claim 1, wherein the optical acceleration sensors are radially mounted in the floating mat assembly.

17. The apparatus according to claim 1, further comprising:
   optical pressure sensors which are mounted at one or more positions of the bottom of the LNG tank to measure the level of the LNG using the optical sensor technology.

18. A method for measuring sloshing in a cargo tank of a liquefied natural gas (LNG) carrier using an apparatus for measuring sloshing in the cargo tank of the LNG carrier, the method comprising the steps of:
   floating a floating mat assembly disposed on the surface of LNG stored in the cargo tank of the LNG carrier based on a movement of the LNG; and
   measuring acceleration of the movement of the floating mat assembly via optical acceleration sensors mounted at one or more position of the floating mat assembly, such that the optical acceleration sensors float on or within the LNG, using an optical sensor technology,
   wherein the floating mat assembly is formed by a coupling of a plurality of floating mat units.

19. The method according to claim 18, further comprising the step of:
   measuring strain of a cargo tank inner wall, which is generated by shock applied to the cargo tank inner wall when the LNG moves, by optical strain sensors using the optical sensor technology.

20. The method according to claim 19, further comprising the step of:
   allowing data analyzing means to receive data from either the optical acceleration sensors or the optical strain sensors while communicating with the optical acceleration sensors or the optical strain sensors outside the LNG tank of the LNG carrier and to calculate a predetermined result value from the data.

21. The apparatus according to claim 20, wherein the data analyzing means measures the floating speed and distance of the floating mat assembly from the acceleration data received from the optical acceleration sensors.

22. The apparatus according to claim 20, wherein the data analyzing means measures the power of the floating mat assembly applied to the cargo tank inner wall of the LNG carrier from the acceleration data received from the optical acceleration sensors.

23. The apparatus according to claim 20, wherein the data analyzing means measures strain of the floating mat assembly from the acceleration data received from the optical acceleration sensors.

24. The apparatus according to claim 18, further comprising the step of:
   measuring the level of the LNG by optical pressure sensors using the optical sensor technology.

* * * * *